Oct. 3, 1939.　　　W. C. GROENIGER　　　2,174,743
ANTISIPHONING DEVICE
Filed Aug. 3, 1937

INVENTOR
William C. Groeniger
BY
Henry J. Lucke
HIS ATTORNEY

Patented Oct. 3, 1939

2,174,743

UNITED STATES PATENT OFFICE 2,174,743

ANTISIPHONING DEVICE

William C. Groeniger, Columbus, Ohio, assignor to John B. Pierce Foundation, New York, N. Y., a corporation of New York Application August 3, 1937, Serial No. 157,107

1 Claim. (Cl. 137—69)

My present invention relates to plumbing devices and more particularly to an improved device for preventing back-flow of liquid to a source of water supply.

More particularly my invention is directed to an improved device for affording a flow of liquid in one direction only and to prevent return flow of liquid under abnormal conditions, such as the establishment of a condition of vacuum or low pressure in the liquid supply system.

The present invention is applicable for use in a variety of situations but has been designed primarily for installation in a supply system leading from a source of potable water or other liquid supply and having a receptacle served by such supply system and the present device precludes the possibility of any water which has passed through the device of the present invention and into the receptacle from returning to the supply pipe into the supply system under all circumstances of use.

Preferred forms of my present invention embody a coupling device arranged for interposition between a supply pipe and a pipe leading to a receiving receptacle, such device being provided with a chamber in which is located one or more arcuately dished annular valve members arranged to prevent leakage of water upon the flow of water from the source of supply to the receiving receptacle and to permit admission of air to the pipe leading to the source of supply upon the establishment of abnormal conditions in the supply system. In the device are a plurality of air openings which exceed in cross sectional area the cross sectional area of the supply pipe.

A feature of my invention is an improved back pressure control device.

A feature of my invention is an improved device for preventing return-flow of water which has once passed through the supply pipe from return thereto under any condition.

Further features of my invention will appear as the description of the invention progresses.

Figure 1:
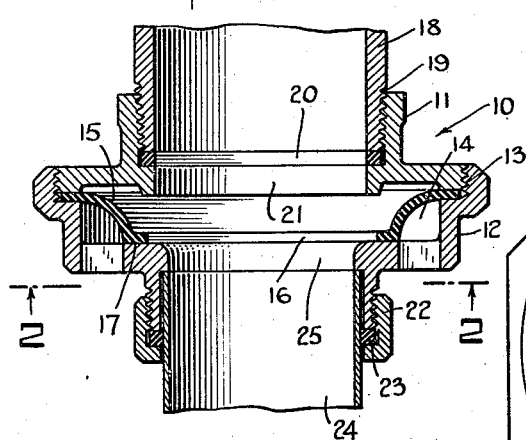
Fig. 1 is a sectional elevation of a structure embodying my invention, illustrating the employment of a single arcuately dished annular resilient valve member.
Figure 2:
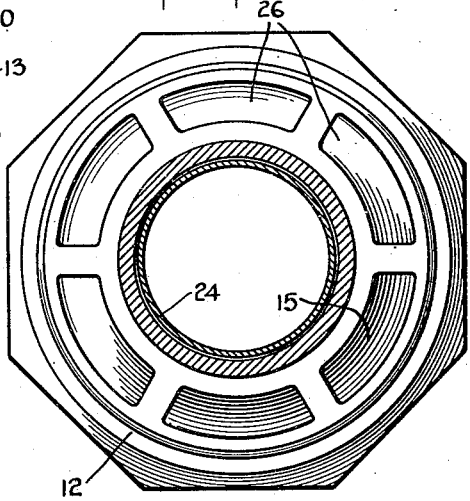
Fig. 2 is a view in sectional plan taken on the line 2—2 of Fig. 1.

Referring to the drawing, and particularly to Figs. 1 and 2, 10 designates a structure embodying my invention and comprising an inlet end 11 removably secured to an outlet end 12 in any convenient or suitable manner as by means of threads 13. The end members 11 and 12 when in assembled position define a chamber 14 within which is housed a single valve 15 of flexible resilient material such for example as rubber. The valve 15 is arcuately dished and annular in form and its outer periphery is gripped between the cooperating faces of the inlet and outlet ends 11 and 12, respectively. The lower face of the valve 15 adjacent the central perforation 16 therein contacts with a valve seat 17 formed on the upper inner face of the outlet end 12.

The inlet end 11 has associated therewith an inlet or supply pipe 18 leading from any suitable source of water supply and removably attached to the inlet end 11 in any convenient manner as by the threads 19. For the purpose of insuring a water-tight joint between the inlet pipe 18 and the inlet end 11 there is preferably provided a washer 20 of flexible resilient material, such for example as rubber. The entrance end 11 is provided with a bore 21 in axial alignment with the bore of the inlet pipe 18, and such bore 21 extends downwardly into the chamber 14, and acts to direct water from the inlet pipe 18 into the chamber 14.

The outlet end 12 has attached thereto in any convenient manner, as by a coupling member 22 and washer 23, an outlet pipe 24 which is in axial alignment with the outlet passage 25 of the end 12.

Water or other liquid flowing from a source of supply through the inlet pipe 18 will flow through the inlet passage 21, the chamber 14, the opening 16 in the flexible valve 15, and thence through the outlet pipe 24, to a receptacle. The pressure of water on the valve member 15 will insure that the valve member will seat closely on the valve seat 17 formed in the lower end 12 and thus prevent leakage of water through the perforations 26 in the lower end member 12. The combined sectional area of the perforations is in excess of the cross sectional area of the inlet passage 21 of the inlet end 11 or of the inlet pipe 18. Therefore, if because of abnormal conditions arising in the source of supply or in the piping or fixtures leading from such source of supply to the supply pipe 18, tending to reduce the pressure of the water therein or to create a vacuum such as would tend to cause a reverse flow of liquid from the receptacle attached to the outlet pipe 24, the building up of a vacuum will cause the resilient valve member 15 to lift off the seat 17 and air will rush through the orifices 26 into the chamber 14 and thence through the valve 15 into the inlet pipe 18 and will effectively prevent the establishment of a vacuum condition sufficient to cause a return flow of water through the inlet pipe 18.

Figure 3:
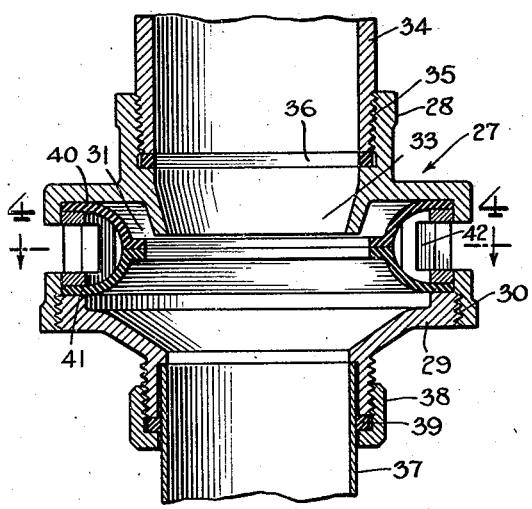
Fig. 3 is a sectional elevation through a structure embodying my invention, illustrating the employment of two opposingly positioned, arcuately dished annular resilient valve members.
Figure 4:
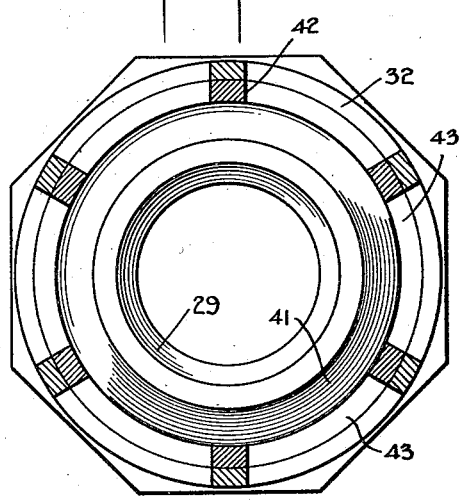
Fig. 4 is a sectional plan view taken on the line 4—4 of Fig. 3.

Referring now to Figs. 3 and 4 there is shown a device 37 embodying my present invention and in which said device 27 there is an inlet end 28 and an outlet end 29 detachably secured to the other in any convenient manner as by the threads 30 and which inlet and outlet means 28 and 29 respectively define a chamber 31 therebetween and which chamber is open to the atmosphere through the medium of a plurality of openings or orifices 32. The inlet end 28 is provided with a restricted opening or nozzle 33 for directing the jet flow of water through the chamber 31. Also, there is attached to the inlet end 28 an inlet pipe 34, such connection, being preferably removable as by means of threads 35, and in order to positively assure a water-tight connection between the end 28 and inlet pipe 34 I provide a washer 36 of preferably flexible resilient material such as rubber.

The outlet end 29 is secured thereto an outlet pipe 37, such securement being by means of a coupling nut 38 and a washer 39.

Located within the chamber 31 are two cooperating opposingly positioned, arcuately dished, flexible valve members, an upper one 40, corresponding to the single arcuately dished flexible valve 15 of the embodiment shown in Fig. 1, and a lower one 41 positioned opposingly to the valve 40. The outer peripheral edges of the valve members 40 and 41 are spaced apart from each other by a spider 42 which is provided with openings 43 that are brought into alignment with the openings 32 in the open member 28. The normal position of the valve members 40 and 41, with respect to each other is clearly shown in Fig. 3 where it will be apparent that if water or other liquid is flowing from the inlet pipe 34 into and through the device 27, that the said water or other liquid passes through the nozzle 33 and is directed through the cooperating valve members 40 and 41 into the outlet pipe 37. However, as the chamber 31 will be filled with water the cooperating valve members 40 and 41 will prevent an outflow of such water through the passages 32.

Upon the initiation of abnormal conditions in the water supply system such for example as would cause a lowering of pressure or the tending to establish a vacuum or negative pressure in the system, such negative pressure will tend to cause a return flow of water in the inlet pipe 34, and a consequent withdrawing of water from the outlet pipe 37 into the inlet pipe 34. This is prevented, however, as upon the establishment of a low pressure of condition of vacuum in the supply system, the valve members 40 and 41 will move out of engagement with each other permitting air to flow through the wall perforations 32 and 43 and such air passing into the chamber 31 will break up or prevent the further establishment of a vacuum condition in the water supply system. As the cross sectional area of the combined perforations 32 and 43 is greater than the cross sectional area of the inlet pipe 34, no vacuum which cou'd arise especially in the water supply system, would be sufficient to cause withdrawal of water from the outlet pipe 37 back in the water supply system.

Whereas I have described my invention by reference to specific forms thereof, it will be understood that many changes and modifications may be made without departing from the spirit of the invention.

I claim:

An improved air-break valve comprising a body having a chamber therein and fluid inlet and outlet passages, said body including a portion provided with one or more openings communicating with the outer atmosphere, a pair of arcuately dished valve members of flexible material, arranged under normal pressure fluid flow to seat in closing position and thereby preclude entry of air into said chamber and under vacuum or other abnormal pressure of the fluid to unseat and effect entry of the air into said chamber through said one or more air openings.

WILLIAM C. GROENIGER.